United States Patent [19]

Cailley et al.

[11] 3,837,925
[45] Sept. 24, 1974

[54] ELECTROCHEMICAL GENERATORS

[75] Inventors: Jean-Pierre Cailley, Ambares; Henri Braun, Bouscat, both of France

[73] Assignee: Saft-Societe des Accumulateurs Fixes et de Traction, Romainville, France

[22] Filed: Sept. 25, 1972

[21] Appl. No.: 291,905

[30] Foreign Application Priority Data

Sept. 29, 1971 France .............................. 71.35029

[52] U.S. Cl. .............................................. 136/134
[51] Int. Cl. ......................................... H01m 13/10
[58] Field of Search .............. 136/83, 133, 134, 135

[56] References Cited
UNITED STATES PATENTS

| | | | |
|---|---|---|---|
| 1,898,344 | 2/1933 | Deibel | 136/133 |
| 2,205,878 | 6/1940 | Eby | 136/134 P |
| 3,396,058 | 8/1968 | Patterson | 136/134 P |
| 3,732,124 | 5/1973 | Cailley | 136/134 P |

Primary Examiner—Winston A. Douglas
Assistant Examiner—H. A. Feeley
Attorney, Agent, or Firm—Kenyon & Kenyon Reilly Carr & Chapin

[57] ABSTRACT

An electrochemical generator of the type embodying an electrode-separator assembly in which the electrodes of opposite polarity respectively project and outwardly from said assembly at different locations and have bared conductive portions to which current collectors are respectively conductively integrated, for example, by welding. The current collector is connected to the electric output terminal of like polarity by a strip of conductive material embodying a plurality of segments of a shape conforming substantially with the shape of the cross-sectional area of the assembly. Transverse scorings in the strip delineate the respective segments and permit folding of the segments. One segment of the strip has a depression to receive and retain a terminal therein as by welding or the like.

The other segments are each provided with centralized openings. The scorings results in permitting accurate reverse folding of the segments in overlying relationship.

18 Claims, 3 Drawing Figures

ELECTROCHEMICAL GENERATORS

RELATED APPLICATIONS

No related applications of the applicants are currently pending.

BRIEF SUMMARY OF INVENTION

The invention relates to electrochemical generators and, in particular, to those of the type comprising an assembly of electrodes and separators, wherein the electrode of the electrodes of one polarity and the electrode or the electrodes of opposite polarity respectively project at opposite locations of the said assembly via conductive portions preferably comprising bared parts of the respective metallic supports of the said electrodes, with the parts of one polarity projecting from at least one location of the said assembly welded or otherwise conductively integrated with a current-collector element, the said element being electrically connected to the appropriate one of the generator terminals as by means of a metallic strip having segments folded back over each other at least twice.

Generators of this general type are known in the art, in particular through French Pat. Nos. 1,415,519, (no corresponding U.S. patent) 1,510,827 (U.S. Pat. Nos. 3,505,121 and 3,650,842) and the U.S. Pat. No. 2,941,022.

In this known art the electrode and separator pack can comprise either coiled or flat electrodes. The current collector element welded to or otherwise conductively integrated with the bared projecting portions of like electrode parts can be in the form of a conductive plate-like member. This member, for instance, may have starlike or Y-shape, or the shape of a Maltese cross as is described in the aforementioned French Pat. No. 1,510,827 (U.S. Pat. Nos. 3,505,121 and 3,650,842).

With the solutions that are known in the art, the current output terminal of the generator, associated with the collector element of like polarity is generally conductively integrated with this element as by welding, hard-soldering or the like or can even be manufactured simultaneously with the collector element from the same piece of material. In such case, the terminal and the collector element are unitary. However, the conductive integration of the terminal directly with the collector element, as aforesaid, especially if the said collector element is a small plate-like member involves numerous problems. In particular, in order to obtain efficient conductive integration of the terminal and the small plate-like member, the latter must be sufficiently thick. This requirement thus is at the expense of the weight and space requirements of the generator, i.e., greater weight and larger volume are required than is necessary for a generator of like capacity embodying the present invention.

Moreover, this thickness requirement makes the welding or electrical integration of such member onto the corresponding projecting electrode parts more difficult because of the disproportionate increase in requisite heat inertia value.

If, instead, a metal strip were to be utilized to effect conductive connection between the terminal and collector element as suggested in the above noted U.S. Pat. No. 2,941,022 and electric welding were employed, a deleterious risk of an excessive heating of this strip results because of its Ohmic resistance. This risk is especially likely if high currents needed for effective electric welding were to be utilized.

The present invention makes it possible to remedy the disadvantages of the known art referred to above.

Objects and features of the present invention are the provision of an electrochemical generator of the general type above described in the introductory paragraph of the Brief Summary of Invention, which is characterized by the fact that the different segments of the metallic strip each have an area approximating that of the cross-section of the assembly and that these segments rest against one another in superposed intimate face to face contacts with the terminal of corresponding polarity welded to said strip.

In accordance with one modification embodying the present invention, the current collector element welded to or otherwise electrically integrated with the projecting bared parts of the electrodes of like polarity constitutes an element of the strip, in particular being one of its extreme elements.

According to another embodiment of the invention, the strip is welded to or otherwise integrated electrically with the particular collector element by one of its extremities.

The present invention as a feature or object thereof is applicable irrespective of whether the electrode-separator assembly is in the form of a cylinder of coiled electrodes and separators, or in the form of a block of flat electrodes and interposed separators. Preferably, when the coiled electrodes and separators form a cylinder, the maximum width of the strip corresponds substantially to the diameter of said cylinder. With an assembly formed of flat electrodes and interposed separators, the width of the strip corresponds substantially to the maximum thickness of the assembly.

Other objects, characteristics and features of the invention will become apparent from the following detailed description and the accompanying drawings given only as examples, and wherein:

FIG. 1 schematically depicts in perspective a view of an embodiment of a strip that can be used within the scope of the instant invention;

FIG. 2 is a schematic illustration of a method of attaching the strip of FIG. 1 to a collector element of a generator in accordance with the invention, and FIG. 3 is a partially cross-sectional view of an electrochemical generator embodying the invention.

DETAILED DESCRIPTION

Figure 1:
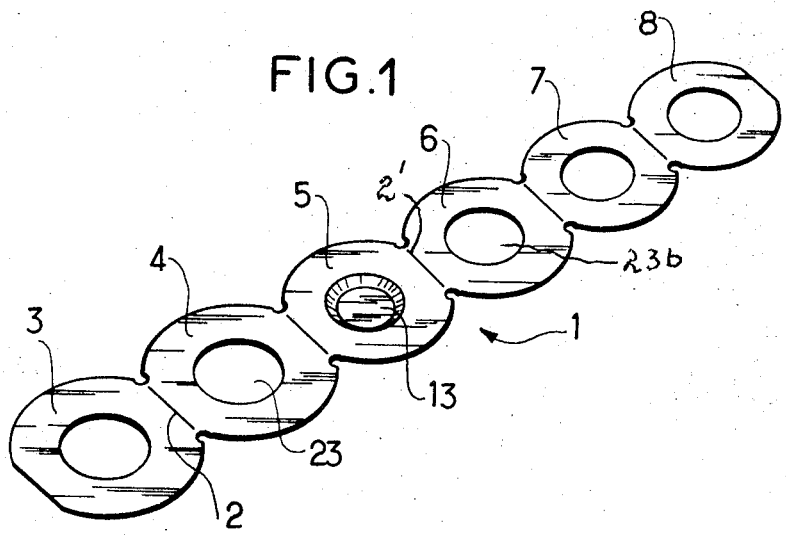

Referring to the drawings, in FIG. 1, reference character 1 denotes a metallic strip for providing electrical connection in a generator in accordance with the invention between a current collector element welded to or otherwise conductively integrated with the bared portions of like electrode parts projecting either from a coiled electrode-separator assembly or from an assembly comprising a plurality of flat electrodes with interposed separators and the corresponding current output terminal of a corresponding generator.

This strip 1 is provided with transverse demarcations or scorings 2, 2', etc., to facilitate folding of the strip. These scorings define segments 3, 4, 5, 6, 7 and 8.

In the example shown in FIG. 1, six segments have been provided in the strip. Besides, since this example is to be used particularly with a generator embodying a coiled electrode-separator assembly in the form of a cylinder, the segments 3, 4, 5, 6, 7 and 8 of the strip 1 are all of like substantially circular shape and whose diameter approximates that of said cylinder, being, however, preferably somewhat less than that of said cylinder.

As shown in the drawing, the strip segments 3, 4, 6, 7 and 8 each is provided with a centrally located opening such as 23. One segment of the strip 1, however, the segment 5 in the example shown in FIG. 1 comprises a countersunk depression 13 instead of an opening. This countersunk depression 13 is dimensioned and shaped to accommodate the particular generator output terminal to which it is to be welded or otherwise conductively integrated. Said strip 1 can be made in any suitable manner, for example, from a nickel-plated steel sheet whose thickness ranges from one to several tenths of a millimeter, and being, for example, stamped out from such a sheet. Other conductive material in sheet from which has electrical and mechanical properties similar to those of said steel sheet can be used if desired.

Figure 2:
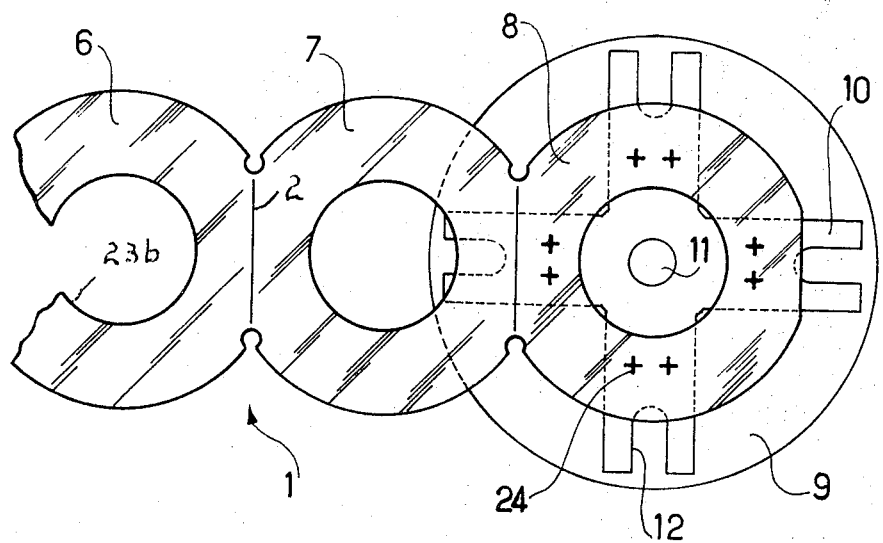

In FIG. 2, the reference character 9 designates an end, e.g., of the upper end of an assembly of coiled electrodes and separators similar to the coiled electrode separator assembly of said U.S. Pat. No. 3,505,121 whose disclosure is herein incorporated. For clarity in the present application, the details at said end are not shown. In FIG. 2 hereof, the reference character 10 designates a collector element welded to or otherwise conductively integrated with bared projecting portions of like electrode parts of a coiled electrode, for instance, those of the positive electrode in the manner disclosed in said U.S. Pat. No. 3,505,121. The said collector element 10 in the example herein depicted has cruciform shape and is provided with a central opening 11.

Figure 3:
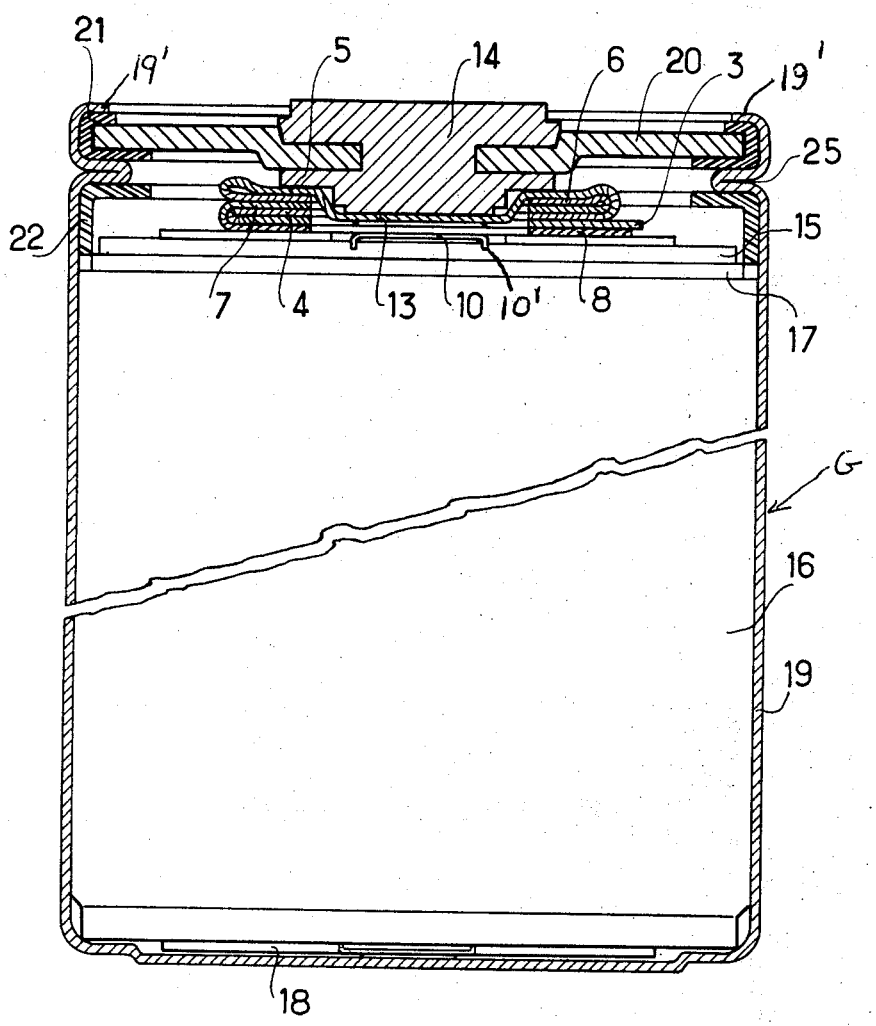

Preferably, the collector element 10 as seen in FIG. 3 may be provided with edges 10' that are substantially perpendicular to the median plane of said element and which become embedded, upon welding, or other conductive integration to bared projecting portions of the particular coiled electrode in this instance the positive electrode. The extremities of the arms of the cruciformly shaped collector element preferably are provided with recesses 12 as shown in FIG. 2.

In a situation in which one segment of the strip is to constitute the collector element, such segment may likewise be provided with edges perpendicular to its median plane.

In the example shown in FIG. 2, the strip segment 8 is spot welded to the collector element 10. The welding spots are designated by the reference character 24. Subsequent to such spot welding of segment 8, the strip 1 is folded over along the scoring 2' between segments 5 and 6 so that the segment 3 rests on the segment 8. These two segments 3 and 8 are welded together. The segments 4 and 5 then rest respectively on the segments 7 and 6.

Then, a portion of the positive terminal of the generator is inserted through opening 23b in segment 6 so as to rest in the countersunk depression 13 of the segment 5 and is welded or otherwise conductively integrated with said segment 5. Thereafter, the assembly formed by the segments 5 and 6 is folded back over the unit constituted by the segments 7 and 4.

This manner of folding is illustrated in FIG. 3 depicting a schematic cross-sectional view of a generator G embodying the invention. Reverting to said figure, the conductive positive output terminal of the generator G is designated by the reference character 14. It may likewise embody a valve, if desired. The projecting bared conductive portion of the positive electrode is designated by the reference 15; the negative electrode is designated by the reference 16. 17 designates the projecting part of the separator. The collector element connected to bared portions of the negative electrode is designated by the reference 18. This element 18 may have a structure similar to that of the collector element 10.

The generator container is designated by the reference 19 and its cover by the reference 20. They can be made of nickel-plated steel or other conductive material. The references 21 and 22 designate seal means or gaskets made of synthetic or other insulative material. Insulating means may be provided, if desired, between the terminal 14 and the cover 20. The generator G is assembled generally in per se known manner. In the example shown, the electrode-separator assembly bearing the negative and positive collector elements is inserted into can 19 so that the negative collector element 18 rests directly on the bottom of said can or container 19 and is preferably welded onto the latter.

The upper part of the can or container 19 comprises a fold 25 applied thereto after insertion of seal means 22. This fold serves as a rest stop or shelf for cover 20 provided with the positive terminal 14. The insulating gasket 21 serves to insulate the cover 20 and terminal 14 from the metallic container 19. The cover is held in place by crimping the upper peripheral edge 19' of can 19 over the upper surface of gasket 21. The pressure on gasket 21 exerted as a result of such crimping provides additional sealing effect against leakage from the container of its contents. In the event that the current output terminal is the cover itself, the strip 1 can advantageously comprise a segment having a boss rather than a depression. This boss is then welded to or otherwise conductively integrated with the cover. The said boss or the depression 13 can both be regarded as offset portions of a segment.

The application of this invention makes it possible to achieve conductive integration of the collector element and the corresponding output terminal in an excellent and efficient manner because thin collector elements may be used.

Moreover, the shape of the connecting strip and the large area of its segments embodied in the practice of this invention makes it possible to provide substantial cross-sectional areas for passage therethrough of high rate currents. As a result, the generator is capable of withstanding high current rates without suffering any heat damage.

While the coiled electrode separator assembly has been described as being cylindrical, it also may have oval or other cross sectional shape in wound condition of its electrode-separator components. The segments of said strip in such event would have shapes in conformity with the cross-sectional shape of such assembly or pack. It is to be understood that the invention is not limited to the modifications described and illustrated hereinabove which were presented by way of example only. In particular, within the scope of the claimed invention, modifications of details, changes, certain arrangements or replacement of certain means by equivalent ones are possible and are contemplated.

What is claimed is:

1. In an electrochemical generator of the type embodying output terminals of opposite polarity, an assembly of electrodes of opposite polarity and separators, said electrodes of opposite polarity have conductive edge portions respectively projecting from opposite locations of said assembly, the said portions being parts of metallic supports of respective electrodes, and a current collector element spanning conductive edge portions of like polarity and conductively integrated therewith, that improvement comprising means for electrically connecting a said current collector element to one output terminal, said means comprising a metallic strip demarcated into segments and folded over upon itself at least twice to bring said segments into face to face alignment with each other, said segments having dimensions approximating those of said assembly at the location of said assembly whereat said current collector element is positioned, said segments resting against one another in the folded over state of said strip with one of said segments conductively integrated with said last-named output terminal.

2. Generator according to claim 1 wherein said current collector is a part of said strip.

3. Generator according to claim 1 wherein said current collector element is a segment of said strip.

4. Generator according to claim 1 wherein said segments have shapes whose contours are like those of said assembly at said location.

5. Generator according to claim 1 wherein at least some of said segments have centrally located openings, which in folded state of said strip are aligned.

6. Generator according to claim 1 wherein at least one of said segments has an offset portion conductively integrated with said last named output terminal.

7. Generator according to claim 1 wherein at least one said conductive integration is a weld.

8. In an electrochemical generator of the type embodying current output terminals, an electrode and separator assembly having electrodes of opposite polarity arranged alternately and interposed separators and with edge portions of said electrodes respectively projecting from opposite locations of said assembly via conductive portions which are parts of metal supports of the said electrodes, with the portions projecting from at least one location of the said assembly welded to one current collector element, means for electrically connecting said element with one of said generator output terminals comprising a metallic strip folded over itself at least twice, said strip being demarcated into different segments whose dimensions approximate those of the assembly at said last-named location and rest against one another, said one of said terminals being welded to the said strip.

9. Generator according to claim 8 wherein said current collector element is a part of the strip.

10. Generator according to claim 8, wherein said strip is welded to the current collector element.

11. Generator according to claim 8, said segments have a contour of substantially the same shape as that of said assembly at said last-named location.

12. Generator according to claim 8, wherein at least some of the said segments have central openings which in folded state of said strip are aligned.

13. Generator according to claim 8, wherein at least one of the segments of the strip has a depression within which said one of said output terminals is welded.

14. Generator according to claim 8 wherein at least one of said segments has a boss to which said one of said output terminals is welded.

15. That improvement in the method of manufacturing an electrochemical generator for effecting electrical connection between a current collector element and at least one current output terminal of said generator comprising providing a conductive metallic strip, demarking said strip into segments, conductively integrating one of said segments with said one current output terminal and folding said strip at least twice so that its segments rest upon each other and another one of said segments is in conductive contact with said collector element.

16. That improvement in the method according to claim 15, wherein conductive integration of said last named one of said segments with said collector element is effected by welding.

17. That improvement in the method according to claim 15 wherein said segments each have a shape which corresponds in contour with the contour of the generator at that region thereof whereat said current collector is located.

18. In an electrochemical generator of the type embodying output terminals of opposite polarity, an assembly of electrodes of opposite polarity and interposed separators, said electrodes of opposite polarity having conductive edge portions respectively projecting from opposite locations of said assembly, the said conductive edge portions being metallic, and a current collector element spanning conductive edge portions of like polarity and being conductively integrated therewith, that improvement comprising means for electrically connecting said current collector element to one of said output terminals, said means comprising a metallic strip demarcated into segments, said strip being folded over upon itself at least twice to bring said segments into face to face alignment with each other, said segments having dimensions and contour approximating those of said assembly at the location of said assembly whereat said current collector is positioned, said segments in the folded overstate of said strip resting against one another in intimate face to face contact, one of said segments being integrated with said last-named one of said output terminals, some of said segments having centrally located openings which are aligned in the folded-over state of said strip, and one of said segments having an offset portion conductively integrated with said last-named output terminal, said offset portion extending into at least some of said openings, the intimate face to face contact of said segments in folded over state of said strip providing for high current carrying capability of said means whereby said generator is capable of withstanding high current rates without heat damage.

* * * * *